(12) United States Patent
Min (10) Patent No.: US 10,913,453 B2
(45) Date of Patent: Feb. 9, 2021

(54) VEHICLE DRIVING CONTROL APPARATUS AND VEHICLE DRIVING CONTROL METHOD

(71) Applicants: HYUNDAI MOTOR COMPANY, Seoul (KR); KIA MOTORS CORPORATION, Seoul (KR)

(72) Inventor: Kyung Deuk Min, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 173 days.

(21) Appl. No.: 16/184,194

(22) Filed: Nov. 8, 2018

(65) Prior Publication Data

US 2020/0079364 A1 Mar. 12, 2020

(30) Foreign Application Priority Data

Sep. 6, 2018 (KR) .......................... 10-2018-0106639

(51) Int. Cl.

| | |
|---|---|
| *B60W 30/09* | (2012.01) |
| *B60Q 9/00* | (2006.01) |
| *G08G 1/16* | (2006.01) |
| *B60W 30/18* | (2012.01) |
| *B60W 30/12* | (2020.01) |
| *G01S 13/931* | (2020.01) |
| *G06K 9/00* | (2006.01) |

(52) U.S. Cl.
CPC ............ *B60W 30/09* (2013.01); *B60W 30/12* (2013.01); *B60W 30/18163* (2013.01); *G01S 13/931* (2013.01); *G06K 9/00805* (2013.01); *G08G 1/166* (2013.01); *G08G 1/167* (2013.01); *G01S 2013/9315* (2020.01); *G01S 2013/93271* (2020.01); *G01S 2013/93272* (2020.01)

(58) Field of Classification Search
CPC ...... B60W 20/09; B60W 10/20; B60W 30/09; B60W 30/04; B60W 40/06; G01S 13/93; B60Q 9/00; G08G 1/01; G08G 1/16; G06T 17/05

See application file for complete search history.

(56) References Cited

U.S. PATENT DOCUMENTS

| | | | |
|---|---|---|---|
| 2005/0015203 A1* | 1/2005 | Nishira | .................. G08G 1/167 701/301 |
| 2011/0163909 A1* | 7/2011 | Jeong | ....................... H01Q 5/42 342/70 |
| 2016/0023598 A1* | 1/2016 | Kohler | .................. G01S 13/931 340/435 |
| 2017/0101092 A1* | 4/2017 | Nguyen Van | ....... B60W 30/095 |
| 2018/0304897 A1* | 10/2018 | Kim | ..................... G01N 29/041 |
| 2019/0308611 A1* | 10/2019 | Lee | .................... B60G 21/0558 |
| 2020/0013281 A1* | 1/2020 | Eriksson | ............. H04L 43/0864 |

FOREIGN PATENT DOCUMENTS

| | | | | |
|---|---|---|---|---|
| KR | 10-1442702 B | | 9/2014 | |
| KR | 20160065615 A | * | 6/2016 | ............ B60W 10/20 |

* cited by examiner

*Primary Examiner* — Yuri Kan
(74) *Attorney, Agent, or Firm* — Morgan, Lewis & Bockius LLP (57) ABSTRACT

A vehicle driving control apparatus and a vehicle driving control method are provided for controlling the driving of the vehicle to follow a return path corresponding to a position of an obstacle in a blind spot to avoid a collision with the obstacle located in the blind spot when the vehicle, which is changing lanes or leaving a lane, returns to its original driving lane.

20 Claims, 8 Drawing Sheets

VEHICLE DRIVING CONTROL APPARATUS AND VEHICLE DRIVING CONTROL METHOD

CROSS-REFERENCE TO RELATED APPLICATION

This application is based on and claims the benefit of priority to Korean Patent Application No. 10-2018-0106639, filed on Sep. 6, 2018, in the Korean Intellectual Property Office, the disclosure of which is incorporated herein in its entirety by reference.

TECHNICAL FIELD

The present disclosure relates to a vehicle driving control apparatus and a vehicle driving control method.

BACKGROUND

In general, a technique that prevents a vehicle from colliding with obstacles by controlling the steering of the vehicle controls the steering of the vehicle to return the vehicle to its original driving lane if there is a possibility of collision with a vehicle traveling in an adjacent lane when the vehicle changes lanes or leaves a lane.

The conventional anti-collision technique returns the vehicle to its original driving lane using a front camera, a front radar, a rear-side radar, and various sensors in the vehicle. However, there is an area (hereinafter, referred to as "blind spot") in which obstacles around the vehicle are not sensed due to the limitation in sensing range of each of the front camera, the front radar, and the rear-side radar, and the conventional anti-collision technique returns the vehicle to its original driving lane without considering the blind spot. As a result, the collision between the vehicle and the obstacles in the blind spot is not prevented.

SUMMARY

The present disclosure has been made to solve the above-mentioned problems occurring in the prior art while advantages achieved by the prior art are maintained intact.

An aspect of the present disclosure provides a vehicle driving control apparatus and a vehicle driving control method, which are capable of preventing the vehicle from colliding with obstacles in a blind spot by controlling a driving of the vehicle to follow a return path corresponding to positions of the obstacles in the blind spot when returning the vehicle, which is changing lanes or leaving a lane, to its original driving lane.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a vehicle driving control apparatus includes a position estimation processor that tracks a vehicle detected by a front radar or a rear-side radar and estimates a position of the vehicle in a blind spot located between a detection area of the front radar and a detection area of the rear-side radar and a controller that controls an ego vehicle such that the ego vehicle follows a path where a collision with the vehicle is avoided based on a distance between the position of the vehicle estimated by the position estimation processor and the ego vehicle.

The controller controls a brake of the ego vehicle and controls a steering of the ego vehicle such that the ego vehicle follows the path, where the vehicle detected by the rear-side radar is not detected by the front radar after entering the blind spot.

The controller sets a reference time period for estimating an effective position of the vehicle in the blind spot. The controller controls the brake of the ego vehicle when the reference time period is exceeded and controls the steering of the ego vehicle such that the ego vehicle follows a path having a shortest distance from a line that the ego vehicle intends to cross. The controller controls the brake of the ego vehicle, where the reference time period is not exceeded and controls the steering of the ego vehicle such that the ego vehicle follows a path based on a distance between the estimated position of the vehicle and the ego vehicle.

The controller expands an area corresponding to the estimated position of the vehicle in accordance with an elapsed time from a time point at which the vehicle completely enters the blind spot within the reference time period. The controller expands the area corresponding to the estimated position of the vehicle in proportion with a speed of the vehicle.

The controller controls a steering of the ego vehicle such that the ego vehicle follows a path having a longest distance from a line that the ego vehicle intends to cross, where the vehicle detected by the front radar is detected by the rear-side radar after passing through the blind spot. The position estimation processor estimates the position of the vehicle in the detection area of the front radar. The controller determines that a first vehicle and a second vehicle are identical to each other, where a position, which is estimated by the position estimation processor, of the first vehicle in the detection area of the front radar and a position of the second vehicle detected by the front radar are within an error range.

According to another aspect of the present disclosure, a vehicle driving control method includes tracking, by a position estimation processor, a vehicle detected by a front radar or a rear-side radar and estimating a position of the vehicle in a blind spot located between a detection area of the front radar and a detection area of the rear-side radar, and controlling, by a controller, an ego vehicle such that the ego vehicle follows a path where a collision with the vehicle is avoided based on a distance between the position of the vehicle estimated by the position estimation processor and the ego vehicle.

The controlling of the ego vehicle includes controlling a brake of the ego vehicle and controlling a steering of the ego vehicle such that the ego vehicle follows the path, where the vehicle detected by the rear-side radar is not detected by the front radar after entering the blind spot.

The controlling of the ego vehicle includes setting a reference time period for estimating an effective position of the vehicle in the blind spot. The controlling of the ego vehicle includes controlling the brake of the ego vehicle when the reference time period is exceeded and controlling the steering of the ego vehicle such that the ego vehicle follows a path having a shortest distance from a line that the ego vehicle intends to cross. The controlling of the ego vehicle includes controlling the brake of the ego vehicle when the reference time period is not exceeded and controlling the steering of the ego vehicle such that the ego vehicle follows a path corresponding to a distance between the estimated position of the vehicle and the ego vehicle.

The controlling of the ego vehicle includes expanding an area corresponding to the estimated position of the vehicle in accordance with an elapsed time from a time point at which the vehicle completely enters the blind spot within the reference time period. The controlling of the ego vehicle includes expanding the area corresponding to the estimated position of the vehicle in proportion with a speed of the vehicle.

The controlling of the ego vehicle includes controlling a steering of the ego vehicle such that the ego vehicle follows a path having a longest distance from a line that the ego vehicle intends to cross, where the vehicle detected by the front radar is detected by the rear-side radar after passing through the blind spot. The estimating of the vehicle includes estimating the position of the vehicle in the detection area of the front radar. The controlling of the ego vehicle includes determining that a first vehicle and a second vehicle are identical to each other when a position, which is estimated by the position estimation processor, of the first vehicle in the detection area of the front radar and a position of the second vehicle detected by the front radar are within an error range.

According to the above, when returning the vehicle, which is changing lanes or leaving the lane, to its original driving lane, the driving of the vehicle is controlled to follow the return path corresponding to the position of the obstacle in the blind spot to avoid the collision with the obstacle located in the blind spot.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In addition, there are many technologies that prevent a vehicle from colliding with obstacles in an area (a blind spot from a driver's point of view) where the driver in the vehicle is not able to see the obstacles behind the vehicle due to a limitation of left and right side mirrors that show a rear area of the vehicle, however, this is a different concept from and is required to be distinguished from a blind spot from a system's point of view referred in the present disclosure. The technologies further include a sensor sensing the obstacles in the blind spot to prevent the collision with the obstacles, however, the present disclosure is a technology that prevents the collision with the obstacles without adding the sensor.

Figure 1:
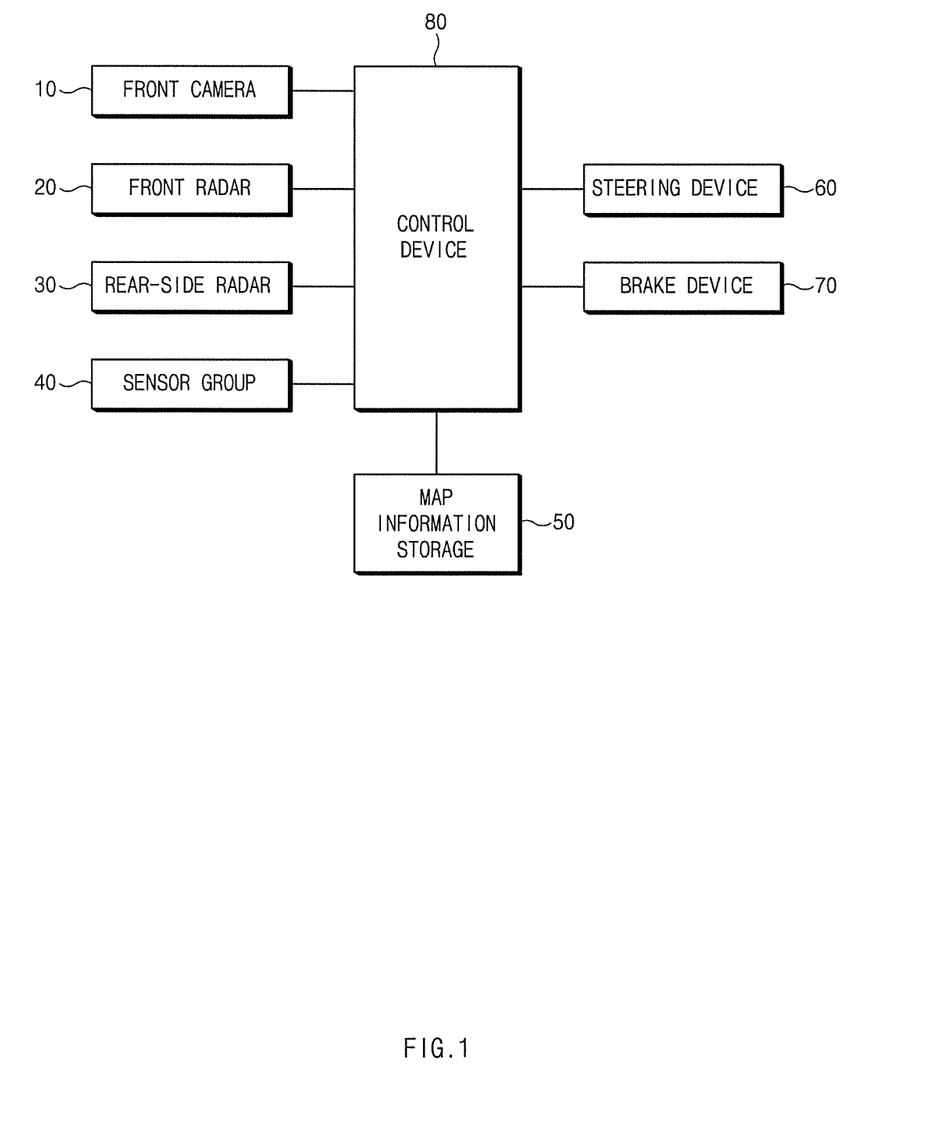
FIG. 1 is a block diagram showing a vehicle driving control system according to an exemplary embodiment of the present disclosure.

FIG. 1 is a block diagram showing a vehicle driving control system according to an exemplary embodiment of the present disclosure.

Referring to FIG. 1, the vehicle driving control system to which the present disclosure is applied may include a front camera 10, a front radar 20, a rear-side radar 30, a sensor group 40, a map information storage 50, a steering device 60, a brake device 70, and a control device 80.

Hereinafter, each component will be described in detail with reference to FIGS. 2 to 6.

Figure 2:
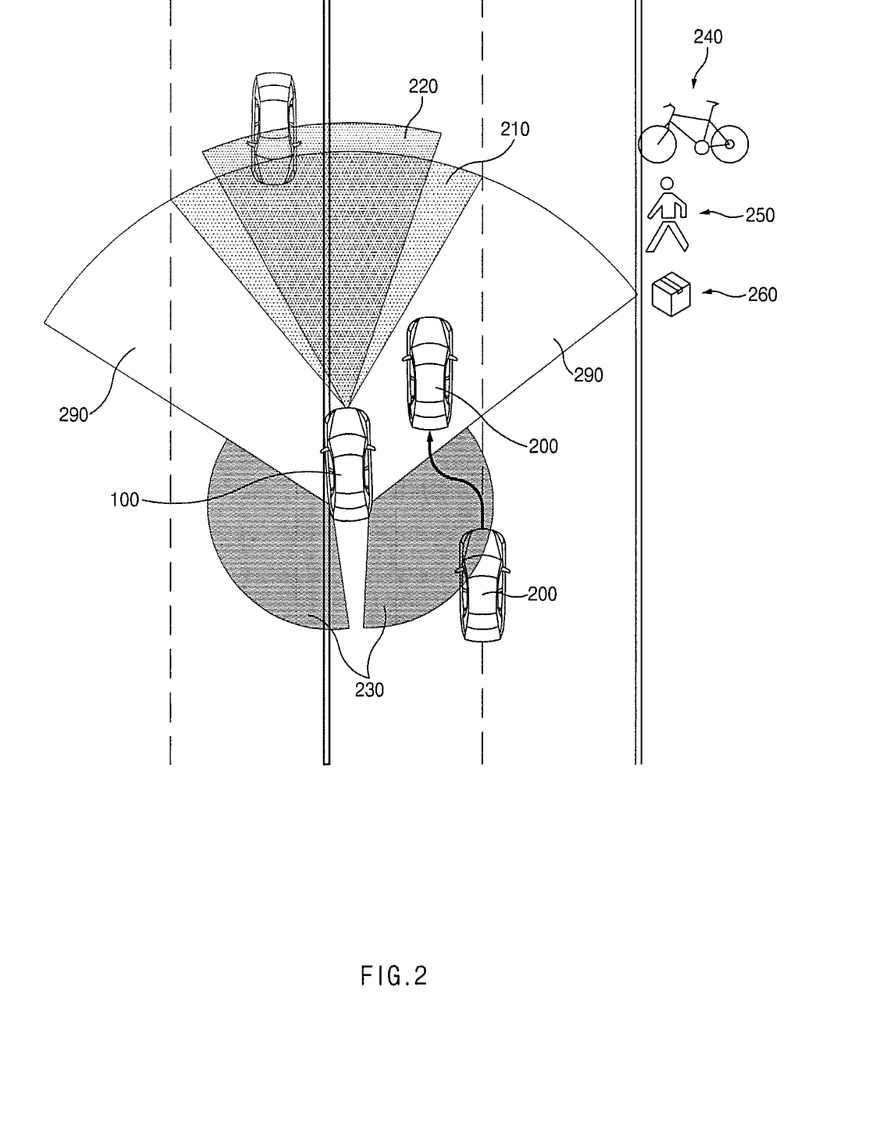
FIG. 2 is a view showing a driving environment of a vehicle to which a vehicle driving control apparatus is applied according to an exemplary embodiment of the present disclosure.

The front camera 10 is mounted on the vehicle and photographs a front area 210 of the vehicle. In this case, the front camera 10 is preferred to be located at a center of left and right sides of the vehicle.

The front radar 20 is mounted on the vehicle and senses obstacles in a front area 220 of the vehicle. The front radar 20 may sense various obstacles, such as a vehicle 200, a bicycle 240, a human 250, and an object 260, and may measure position of the obstacles and distances to the obstacles.

The rear-side radar 30 is mounted on left/right rear sides of the vehicle and senses obstacles in left/right rear areas 230 of the vehicle. The rear-side radar 30 may sense various obstacles, such as a vehicle 200, a bicycle 240, a human 250, and an object 260, and may measure position of the obstacles and distances to the obstacles. Additionally, the rear-side radar 30 may sense obstacles in a blind spot from a driver's viewpoint.

The radars 20 and 30 for the vehicle 200 may include a transmission antenna, a reception antenna, a transmitter, a receiver, and a signal processor.

The transmission antenna may include at least one long distance transmission antenna and at least one short distance transmission antenna, and the transmitter transmits a predetermined transmission signal through the transmission antenna. In particular, the transmitter generates a continuous wave transmission signal to be transmitted to an object in front of or in left/right rear sides of the vehicle and transmits the generated continuous wave transmission signal through the transmission antenna. In the present embodiment, the transmitter may include a digital-to-analog (D/A) converter to convert a digital signal to an analog signal.

The reception antenna may be an array antenna including a plurality of element antennas, and a reception signal received by each element antenna is transmitted to the signal processor. The reception antenna may include a plurality of long distance transmission antennas and a plurality of short distance transmission antennas. The receiver receives a reception signal corresponding to the transmission signal that returns after being reflected by a target through the reception antenna. Particularly, when the continuous wave transmission signal returns after being reflected, the receiver receives the returned continuous wave reflection signal. In the present embodiment, the receiver may include an analog-to-digital (A/D) converter to convert the analog signal to the digital signal.

The signal processor processes the transmission signal of the transmitter and the reception signal received by the receiver. The signal processor may process each reception signal corresponding to the transmission signal that returns after being transmitted by the transmitter and reflected to track a plurality of distances and may select a target located at a nearest distance among the tracked distances as an actual target.

The sensor group 40 may indicate a group of various sensors for measuring the dynamics of the vehicle and may include, for example, a gyro sensor, a wheel speed sensor, a steering angle sensor, a steering torque sensor, a wheel gravity (G) sensor, and a global positioning system (GPS) sensor. In this case, the wheel G sensor may be mounted on both front and rear wheels of the vehicle.

The gyro sensor is a sensor that measures a change in orientation of an object using a characteristic of maintaining a constant direction, which is initially set, at all times with high accuracy regardless of the Earth's rotation.

The wheel speed sensor is a sensor that measures a speed of wheel.

The steering angle sensor is a sensor that measures a steering angle in accordance with a driver's steering wheel operation.

The steering torque sensor is a sensor that is mounted on a steering axis and measures a steering torque in accordance with the driver's steering wheel operation.

The wheel G sensor is an acceleration sensor and generally used in a black box to detect an impact applied to the vehicle.

The GPS sensor is a GPS receiver to detect a current position of the vehicle. The GPS sensor may be the GPS receiver included in a navigation system or black box mounted on the vehicle.

The GPS sensor receives signals from four or more satellites within the line of sight among satellites and calculates its position. The GPS sensor calculates a time delay of the signal received from each satellite and a Doppler shift to calculate a distance between the satellite and the GPS sensor and a distance change rate and obtains position and velocity of the satellite from navigation data obtained by demodulating the received signal. When information about four satellites are obtained through the above-mentioned method, position and velocity of the GPS sensor may be obtained.

The GPS signal has a format in which 50 Hz navigation data are modulated onto a carrier wave signal of about 15 GHz using bi-phase shift keying (BPSK) modulation after its spectrum is spread over a wide bandwidth to satellite-specific pseudo noise code. Accordingly, in the GPS sensor, the code and the carrier wave are required to be removed to acquire the GPS signal and to demodulate the data. To remove the carrier wave, Doppler information about a size and a direction of Doppler shift are needed. In general, when the GPS sensor is stationary, the maximum Doppler shift of about 5 KHz is caused by the satellite motion.

The Doppler information is derived through a method of searching for signals at regular intervals. Meanwhile, codes mixed with the GPS signal are classified into a coarse acquisition (C/A) code that is available for civilian use and a precision (P) code that is used by the military, and each satellite is multiplied with different code. A process for removing the codes means a method of generating the same codes by the GPS sensor and performing convolution the codes and is substantially simultaneously performed with the Doppler search process.

After removing all the codes and carrier wave, a data extraction is possible. In the GPS data, five subframes form one frame, and 25 frames are gathered to form a superframe. Among the data, since subframes have values for a time and a position of the satellite transmitting the GPS data, satellites have different values, and since the subframes have information about all satellites, each satellite has the same values. The positioning of the vehicle becomes possible after acquiring the position and measured values of the satellite by demodulating the data of three, four, or more satellites through the above-described processes.

The map information storage 50 may be a module that stores map information used in the navigation system and may include at least one type of storage medium among a memory of a flash type, a hard disk type, a micro type, and a card type (e.g., a Secure Digital (SD) card or an eXtream Digital (XD) card) and a memory of a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type.

The map information may include information on a horizontal grade of each road, information on a step difference between a road and a non-road, information on lane (the number of lanes, a lane width, and the like), information on road boundaries, information on a curvature of road, information on a road median, information on a road guardrail, information on a road curb, information on a drainage by road, and the like.

The control device 80 controls the driving of an ego vehicle 100 to follow a return path corresponding to the distance between the position of the obstacle 200, 240, 250, and 260 in the blind spot 290 as shown in FIG. 2 and the ego vehicle 100 when returning the ego vehicle 100, which is changing lanes or leaving a lane, to its original driving lane. The control device 80 may control the steering device 60 or both the steering device 60 and the brake device 70 to follow a return path corresponding to the position of the obstacle 200, 240, 250, and 260 in the blind spot 290 when returning the ego vehicle 100, which is changing lanes or leaving a lane, to its original driving lane.

Figure 5:
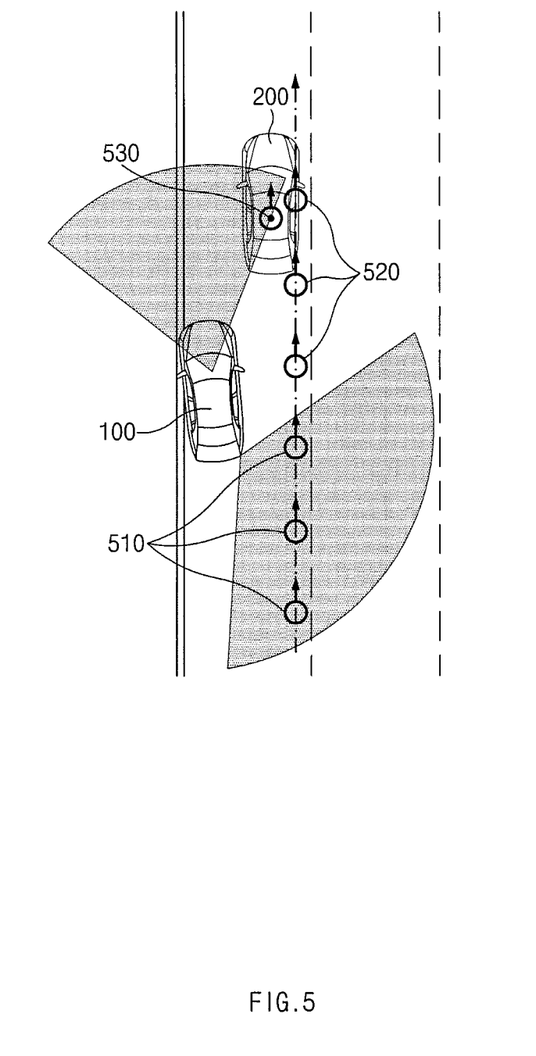
FIG. 5 is a view showing an example of a process in which a vehicle driving control apparatus determines a return path of the vehicle according to an exemplary embodiment of the present disclosure.

In detail, when the vehicle 200 detected by the rear-side radar 30 is detected by the front radar 20 after passing through the blind spot 290 at the time when the ego vehicle 100 returns to its original lane as shown in FIG. 5, the control device 80 determines that the obstacle 200, 240, 250, and 260 does not exist in the blind spot 290 and controls the steering device 60 to follow a third return path 650. In this case, the vehicle 200 detected by the rear-side radar 30 is determined as the same vehicle 200 detected by the front radar 20 when an estimated vehicle position 520 in a detection area of the front radar 20, which is obtained by continuously tracking a position 510, a speed, and an acceleration of the vehicle detected by the rear-side radar 30, and a position 530 of a vehicle detected by the front radar 20 are within an error range. As another way, whether the vehicle detected by the rear-side radar 30 is the same as the vehicle 200 detected by the front radar 20 may be determined by recognizing license plates of the vehicles.

In addition, when the vehicle 200 detected by the front radar 20 is detected by the rear-side radar 30 after passing through the blind spot 290 at the time when the ego vehicle 100 returns to its original lane, the control device 80 may determine that the obstacle 200, 240, 250, and 260 does not exist in the blind spot 290 and may control the steering device 60 to follow the third return path 650. In this case, the vehicle 200 detected by the front radar 20 is determined as the same vehicle 200 detected by the rear-side radar 30 when an estimated position of the vehicle 200 in a detection area of the rear-side radar 30, which is obtained by continuously tracking a position, a speed, and an acceleration of the vehicle 200 detected by the front radar 20, and a position of the vehicle detected by the rear-side radar 30 are within an error range. As another way, whether the vehicle detected by the front radar 20 is the same as the vehicle detected by the rear-side radar 30 may be determined by recognizing license plates of the vehicles.

Figure 6:
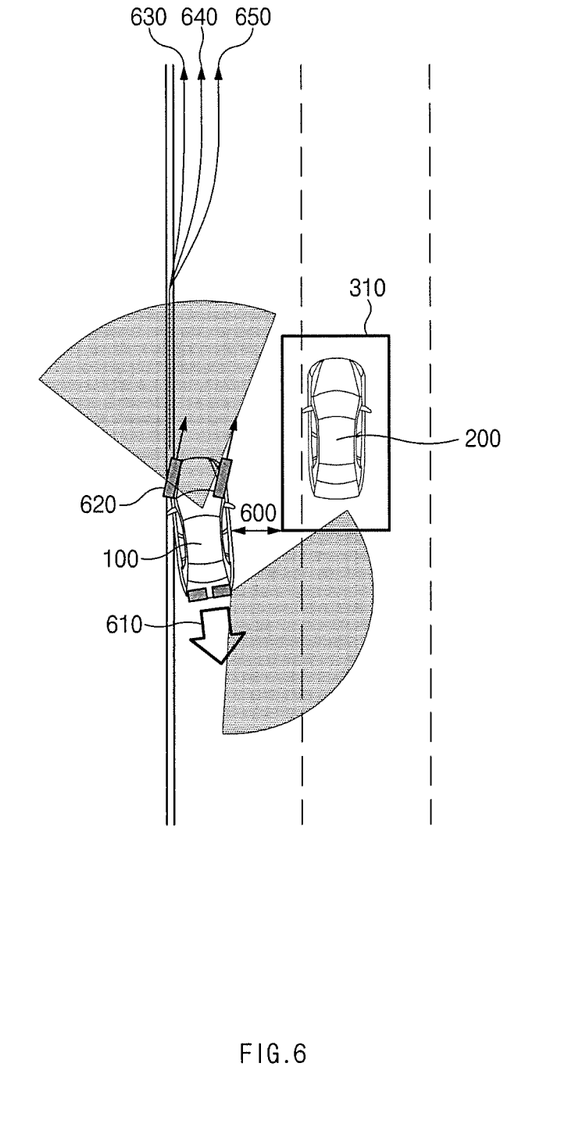
FIG. 6 is a view showing another example of a process in which a vehicle driving control apparatus determines a return path of the vehicle according to an exemplary embodiment of the present disclosure.

In addition, when the vehicle 200 detected by the rear-side radar 30 is not detected by the front radar 20 after entering the blind spot 290 at the time when the vehicle returns to its original lane as shown in FIG. 6, the control device 80 may determine that the vehicle 200 exists in the blind spot 290 and may control the brake device 70 to preferentially apply a predetermined amount of braking power 610 to the ego vehicle 100. Then, the control device 80 controls (620) the steering device 60 of the ego vehicle 100 to follow a return path corresponding to the distance between an estimated position of the vehicle 200 in the blind spot 290 and the ego vehicle 100. In this case, the control device 80 continuously tracks the position, speed, and acceleration of the vehicle 200 detected by the rear-side radar 30 to estimate the position of the vehicle 200 in the blind spot 290.

In the exemplary embodiment, the control device 80 sets a reference time period (e.g., 1 minute) used to estimate the effective position of the vehicle 200 in the blind spot 290, and the estimated results within the reference time period are validated. However, when the set reference time period is exceeded, it is preferable not to perform the estimation process any more since there is no effectiveness in the estimated results.

Accordingly, when the reference time period is not exceeded, the control device 80 selects a return path corresponding to a distance between the estimated position of the vehicle 200 in the blind spot 290 and the ego vehicle 100 (a distance between the vehicle 200 and the ego vehicle 100). In this case, when the set reference time period is exceeded, a first return path 630 is selected.

For example, when a distance 600 between the estimated position of the vehicle 200 in the blind spot 290 and the ego vehicle 100 does not exceed a reference distance (e.g., about 30 cm), the control device 80 selects the first return path 630, and when the distance 600 between the estimated position of the vehicle 200 in the blind spot 290 and the ego vehicle 100 exceeds the reference distance (e.g., about 30 cm), the control device 80 selects a second return path 640 corresponding to the distance 600 between the estimated position of the vehicle 200 in the blind spot 290 and the ego vehicle 100.

In FIG. 6, the first return path 630 indicates a return path (shortest return path) in which a distance from a line where the ego vehicle 100 intends to cross is a minimum distance, the third return path 650 indicates a return path (longest return path) in which the distance from the line where the ego vehicle 100 intends to cross is a maximum distance, and the second return path 640 indicates one return path among one or more return paths between the first return path 630 and the third return path 650. In this case, one return path among one or more return paths between the first return path 630 and the third return path 650 may be selected depending on the distance 600 between the estimated position of the vehicle 200 in the blind spot 290 and the ego vehicle 100.

In addition, when the vehicle 200 detected by the front radar 20 is not detected by the rear-side radar 30 after entering the blind spot 290 at the time when the ego vehicle 100 returns to its original lane, the control device 80 may determine that the vehicle 200 exists in the blind spot 290 and may control the brake device 70 to preferentially apply the braking power to the ego vehicle 100 and may control the steering device 60 to follow the return path corresponding to the distance between the estimated position of the vehicle 200 in the blind spot 290 and the ego vehicle 100. In this case, the control device 80 continuously tracks the position, speed, and acceleration of the vehicle 200 detected by the front radar 20 and estimates the position of the vehicle 200 in the blind spot 290.

Figure 3:
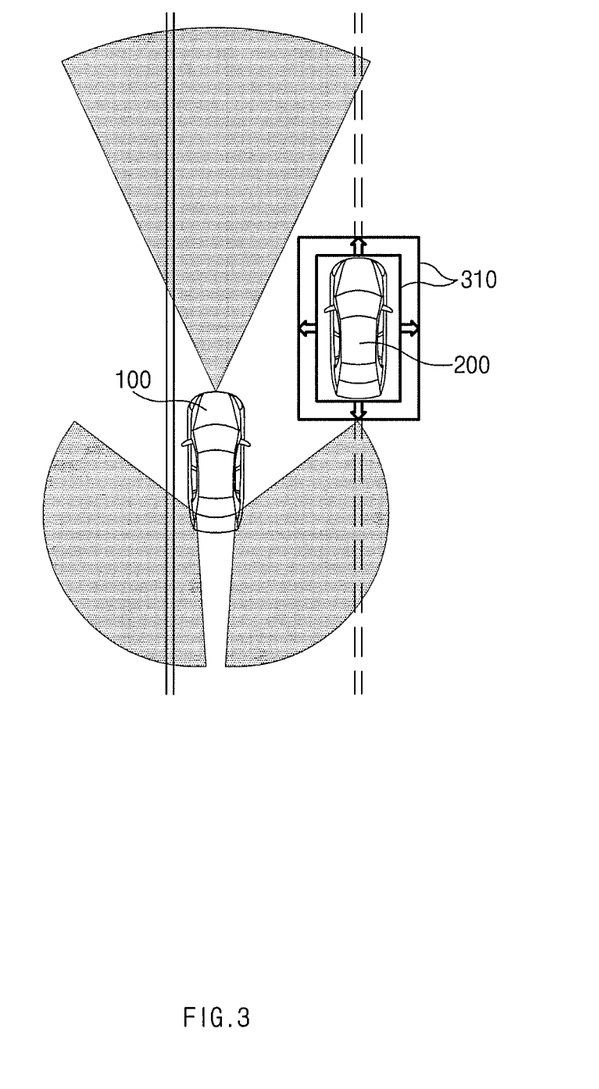
FIG. 3 is a view showing an example of a process in which a vehicle driving control apparatus expands a position range of obstacles in a blind spot according to an exemplary embodiment of the present disclosure.

Meanwhile, since the control device 80 acquires the position (the area where the vehicle is located) of the vehicle 200 in the blind spot 290 through the estimation process as shown in FIG. 3, the effectiveness of the position of the vehicle 200 drops as a time elapses. Accordingly, it is preferable that the area 310 where the vehicle 200 is located is expanded in accordance with the elapsed time from a time point at which the vehicle 200 completely enters the blind spot 290 within the reference time period. This may increase a stability of the system. In this case, a speed of expanding the area where the vehicle 200 is located is in proportion to the speed of the vehicle 200, and the first return path 630 is selected when the distance between the expanded position 310 of the vehicle 200 and the ego vehicle 100 does not exceed the reference distance. In addition, the control device 80 determines that there is no effectiveness when the reference time period is exceeded.

Figure 4:
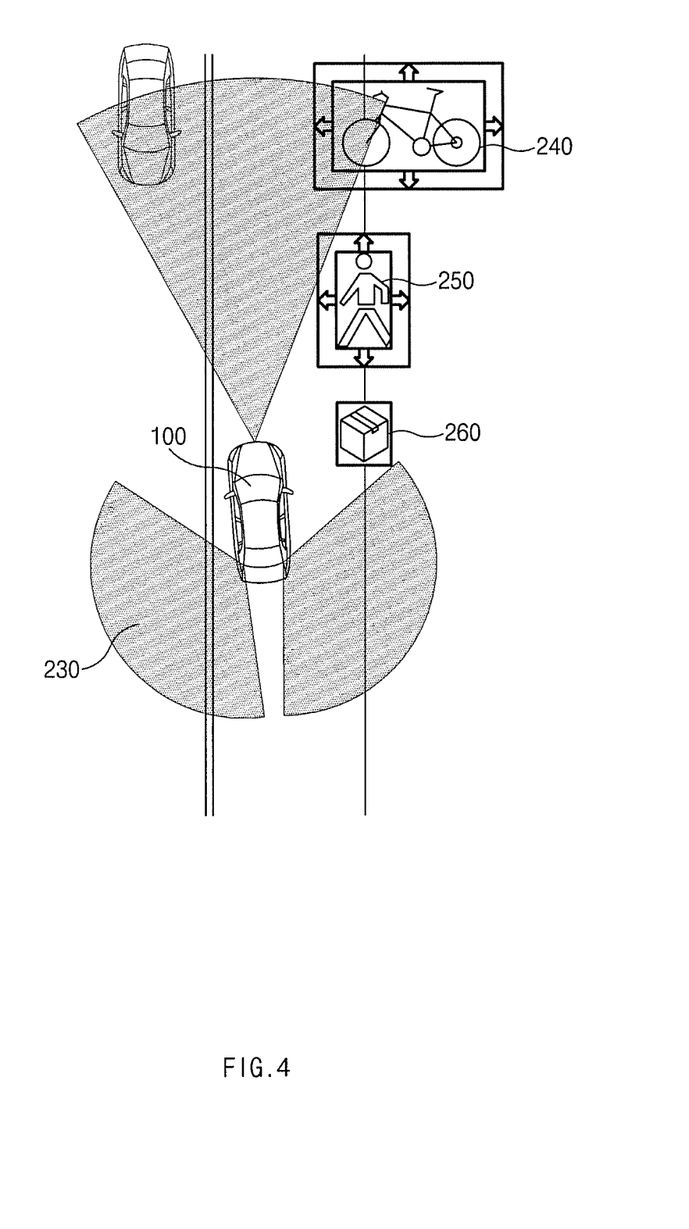
FIG. 4 is a view showing another example of a process in which a vehicle driving control apparatus expands a position range of obstacles in a blind spot according to an exemplary embodiment of the present disclosure.

In addition, when the obstacle is a dynamic obstacle, such as the bicycle 240 or the human 250 as shown in FIG. 4, it is preferable that the control device 80 expands the position area as that of the vehicle 200. However, since the bicycle 240 or the human 250 does not move faster than the vehicle 200, the expansion speed of the position area of the bicycle 240 or the human 250 is set slower than that of the vehicle 200. When the obstacle is static such as the object 260, the position area is not expanded.

Further, the control device 80 may directly generate the return path based on the GPS sensor and the map information to avoid a collision with the vehicle 200 in the blind spot 290 when the ego vehicle 100 returns to its original lane.

Figure 7:
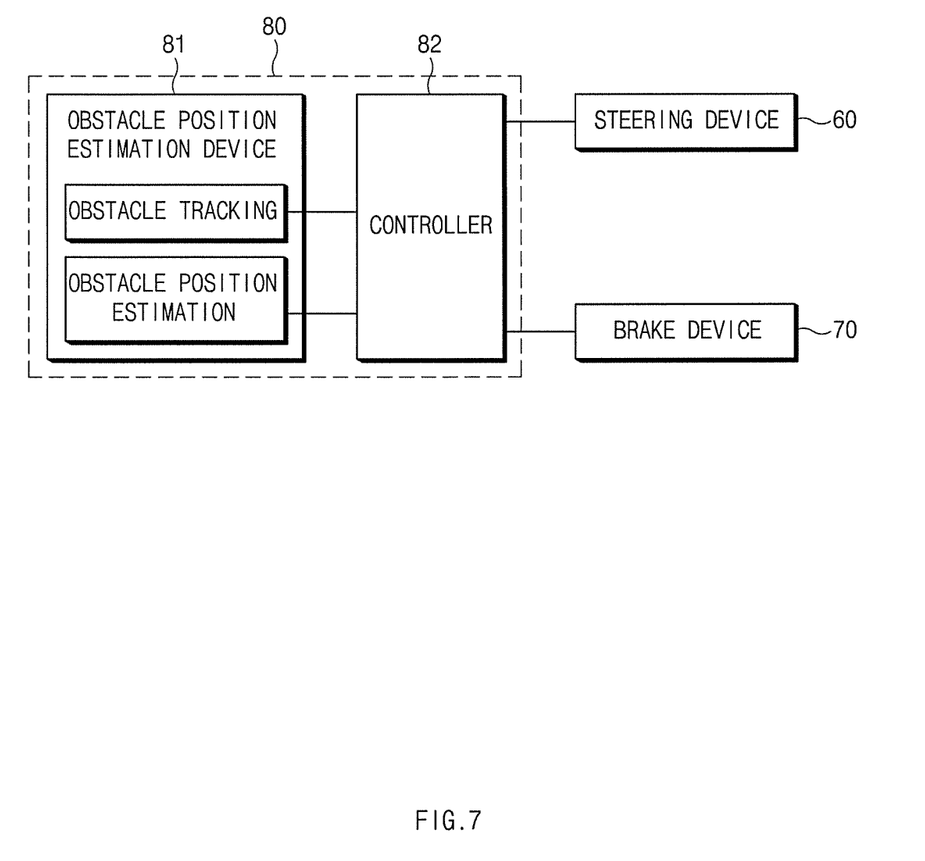
FIG. 7 is a block diagram showing a configuration of a vehicle driving control apparatus according to an exemplary embodiment of the present disclosure.

FIG. 7 is a block diagram showing a configuration of a driving control apparatus of a vehicle according to an exemplary embodiment of the present disclosure.

Referring to FIG. 7, the driving control apparatus 80 of the vehicle according to the present disclosure may include an obstacle position estimation device 81 and a controller 82. The obstacle position estimation device 81 may be an electric circuitry (e.g., a processor, a CPU, etc.) that executes instructions of software which thereby performs various functions described hereinafter. According to embodiments of the present disclosure, components may be combined with each other in one device, and one or more components may be omitted depending on the manner in which the invention is carried out.

First, the obstacle position estimation device 81 continuously tracks the position, speed, and acceleration of the vehicle 200 detected by the rear-side radar 30 and estimates the position of the vehicle 200 in the blind spot 290.

Then, the controller 82 performs an overall control so that each component may normally perform its function. The controller 82 may be implemented in a hardware, a software, or a combination of the hardware and the software. Preferably, the controller 82 may be implemented by a microprocessor, but it should not be limited to the microprocessor.

The controller 82 controls the driving of the ego vehicle 100 to follow the return path corresponding to the distance between the position of the obstacle 200 in the blind spot 290 as shown in FIG. 2 and the ego vehicle 100 when returning the ego vehicle 100, which is changing lanes or leaving the lane, to its original driving lane.

That is, when the vehicle 200 detected by the rear-side radar 30 is detected by the front radar 20 after passing through the blind spot 290 at the time when the ego vehicle 100 returns to its original lane as shown in FIG. 5, the controller 82 determines that the obstacle does not exist in the blind spot 290 and controls the steering device 60 to follow the third return path 650. In this case, the controller 82 determines that the vehicle 200 detected by the rear-side radar 30 is the same as the vehicle 200 detected by the front radar 20 when the estimated vehicle position 520 in the detection area of the front radar 20, which is estimated by the obstacle position estimation device 81, and the position 530 of the vehicle detected by the front radar 20 are within the error range.

In addition, when the vehicle 200 detected by the rear-side radar 30 is not detected by the front radar 20 after entering the blind spot 290 at the time when the ego vehicle 100 returns to its original lane as shown in FIG. 6, the controller 82 may determine that the vehicle 200 exists in the blind spot 290 and may control the brake device 70 to preferentially apply the predetermined amount of braking power 610 to the ego vehicle 100. Then, the controller 82 controls (620) the steering device 60 of the ego vehicle 100 to follow the return path corresponding to the distance between the estimated position of the vehicle 200 in the blind spot 290 and the ego vehicle 100.

In addition, the controller 82 may set the reference time period (e.g., 1 minute) used to estimate the effective position of the vehicle 200 in the blind spot 290, and thus a reliability of the estimated results may be improved. In this case, the controller 82 selects the return path corresponding to the distance between the estimated position of the vehicle 200 in the blind spot 290 and the ego vehicle 100 within the reference time period and selects the first return path 630 closest to the line (the line where the ego vehicle intends to cross) when the reference time period is exceeded.

Further, the controller 82 may expand the area 310 where the vehicle 200 is located in accordance with the elapsed time from a time point at which the vehicle 200 completely enters the blind spot 290 within the reference time period. In this case, the speed of expanding the area where the vehicle 200 is located is in proportion to the speed of the vehicle 200. For instance, when the speed of the vehicle is about 50 kph and the area 310 is expanded by about 10 cm per second, the area 310 may be expanded by about 20 cm per second when the speed of the vehicle is about 100 kph.

Figure 8:
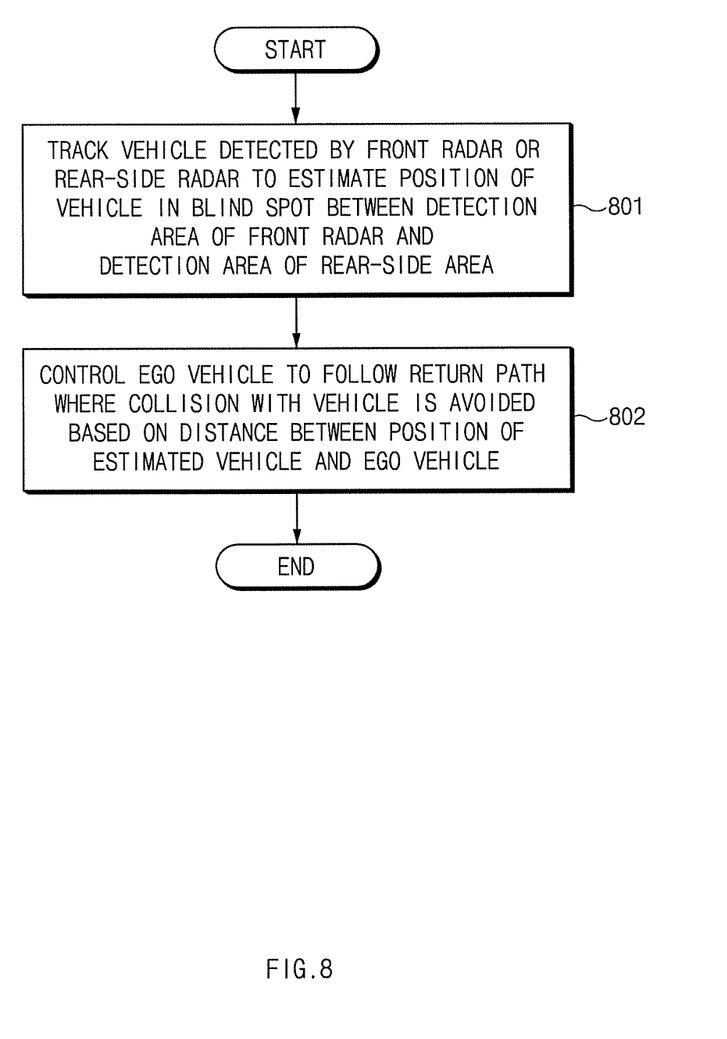
FIG. 8 is a flowchart showing a vehicle driving control method according to an exemplary embodiment of the present disclosure.

FIG. 8 is a flowchart showing a vehicle driving control method according to an exemplary embodiment of the present disclosure.

First, the obstacle position estimation device 81 tracks the vehicle detected by the front radar or the rear-side radar and estimates the position of the vehicle in the blind spot between the detection area of the front radar and the detection area of the rear-side radar (801).

Then, the controller 82 controls the ego vehicle to follow the return path where the ego vehicle may avoid the collision with the vehicle based on the distance between the estimated position of the vehicle and the ego vehicle (802).

Through this process, the ego vehicle may be prevented from colliding with the obstacles located in the blind spot when the ego vehicle, which is changing lanes or leaving the lane, returns to its original driving lane.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. A vehicle driving control apparatus comprising:
    a processor configured to track a second vehicle detected by a front radar or a rear-side radar and to estimate a position of the second vehicle in a blind spot located between a detection area of the front radar and a detection area of the rear-side radar; and
    a controller configured to control an ego vehicle such that the ego vehicle follows a return path, in which a distance between the ego vehicle and the second vehicle is maximum among a plurality of return paths in order to avoid a secondary collision with the second vehicle, when returning the ego vehicle to an original driving lane due to a possibility of a first collision with a first vehicle driving in an adjacent lane.

2. The vehicle driving control apparatus of claim 1, wherein the controller is configured to control a brake of the ego vehicle and to control a steering of the ego vehicle such that the ego vehicle follows the return path, where the second vehicle detected by the rear-side radar is not detected by the front radar after entering the blind spot.

3. The vehicle driving control apparatus of claim 2, wherein the controller is configured to set a reference time period.

4. The vehicle driving control apparatus of claim 3, wherein the controller is configured to control the brake of the ego vehicle, where the reference time period is exceeded and to control the steering of the ego vehicle, such that the ego vehicle follows a path having a shortest distance from a line that the ego vehicle intends to cross.

5. The vehicle driving control apparatus of claim 3, wherein the controller is configured to control the brake of the ego vehicle, where the reference time period is not exceeded and to control the steering of the ego vehicle, such that the ego vehicle follows a path based on a distance between the estimated position of the second vehicle and the ego vehicle.

6. The vehicle driving control apparatus of claim 3, wherein the controller is configured to expand an area corresponding to the estimated position of the second vehicle in accordance with an elapsed time from a time point at which the second vehicle completely enters the blind spot within the reference time period.

7. The vehicle driving control apparatus of claim 6, wherein the controller is configured to expand the area corresponding to the estimated position of the second vehicle in proportion with a speed of the second vehicle.

8. The vehicle driving control apparatus of claim 1, wherein the controller is configured to control a steering of the ego vehicle such that the ego vehicle follows a path having a longest distance from a line that the ego vehicle intends to cross, where the second vehicle detected by the front radar is detected by the rear-side radar after passing through the blind spot.

9. The vehicle driving control apparatus of claim 8, wherein the processor is configured to estimate the position of the second vehicle in the detection area of the front radar.

10. The vehicle driving control apparatus of claim 9, wherein the controller is configured to determine that a third vehicle and a fourth vehicle are identical to each other, where a position, which is estimated by the processor, of the third vehicle in the detection area of the front radar and a position of the fourth vehicle detected by the front radar are within an error range.

11. A vehicle driving control method comprising:
tracking, by a processor, a second vehicle detected by a front radar or a rear-side radar and estimating a position of the second vehicle in a blind spot located between a detection area of the front radar and a detection area of the rear-side radar; and
controlling, by a controller, an ego vehicle such that the ego vehicle follows a return path, in which a distance between the ego vehicle and the second vehicle is maximum among a plurality of return paths in order to avoid a secondary collision with the second vehicle, when returning the ego vehicle to an original driving lane due to a possibility of a first collision with a first vehicle driving in an adjacent lane.

12. The vehicle driving control method of claim 11, wherein the controlling of the ego vehicle comprises controlling a brake of the ego vehicle and controlling a steering of the ego vehicle such that the ego vehicle follows the return path, where the second vehicle detected by the rear-side radar is not detected by the front radar after entering the blind spot.

13. The vehicle driving control method of claim 12, wherein the controlling of the ego vehicle comprises setting a reference time period.

14. The vehicle driving control method of claim 13, wherein the controlling of the ego vehicle comprises controlling the brake of the ego vehicle, where the reference time period is exceeded and controlling the steering of the ego vehicle, such that the ego vehicle follows a path having a shortest distance from a line that the ego vehicle intends to cross.

15. The vehicle driving control method of claim 13, wherein the controlling of the ego vehicle comprises controlling the brake of the ego vehicle, where the reference time period is not exceeded and controlling the steering of the ego vehicle, such that the ego vehicle follows a path based on a distance between the estimated position of the second vehicle and the ego vehicle.

16. The vehicle driving control method of claim 13, wherein the controlling of the ego vehicle comprises expanding an area corresponding to the estimated position of the second vehicle in accordance with an elapsed time from a time point at which the second vehicle completely enters the blind spot within the reference time period.

17. The vehicle driving control method of claim 16, wherein the controlling of the ego vehicle comprises expanding the area corresponding to the estimated position of the second vehicle in proportion with a speed of the second vehicle.

18. The vehicle driving control method of claim 11, wherein the controlling of the ego vehicle comprises controlling a steering of the ego vehicle such that the ego vehicle follows a path having a longest distance from a line that the ego vehicle intends to cross, where the second vehicle detected by the front radar is detected by the rear-side radar after passing through the blind spot.

19. The vehicle driving control method of claim 18, wherein the estimating of the vehicle comprises estimating the position of the second vehicle in the detection area of the front radar.

20. The vehicle driving control method of claim 19, wherein the controlling of the ego vehicle comprises determining that a third vehicle and a fourth vehicle are identical to each other, where a position, which is estimated by the processor, of the third vehicle in the detection area of the front radar and a position of the fourth vehicle detected by the front radar are within an error range.

* * * * *